United States Patent [19]
Casey

[11] 3,811,699
[45] May 21, 1974

[54] AXLE TRUNNION SUPPORT ARRANGEMENT

[75] Inventor: Robert Casey, Washington, Ill.

[73] Assignee: Caterpillar Tractor Co., Peoria, Ill.

[22] Filed: Aug. 21, 1972

[21] Appl. No.: 282,136

[52] U.S. Cl. .............................. 280/111, 180/43 R
[51] Int. Cl. ............................................ B60g 9/02
[58] Field of Search............ 280/111; 180/42, 43 R, 180/44 R, 47, 48, 49, 50

[56] References Cited
UNITED STATES PATENTS

| | | | |
|---|---|---|---|
| 3,702,196 | 11/1972 | Krutis | 280/111 |
| 1,066,072 | 7/1913 | Bovas | 180/50 |
| 3,023,826 | 3/1962 | Larson et al. | 180/50 |
| 1,405,159 | 1/1922 | Polaski et al. | 180/42 |
| 2,917,123 | 12/1959 | Ainsworth | 180/43 R |
| 3,679,016 | 7/1972 | Bixby | 180/44 R |

FOREIGN PATENTS OR APPLICATIONS 0,324,741  2/1930  Great Britain ..................... 280/111

Primary Examiner—Philip Goodman
Assistant Examiner—John A. Carroll
Attorney, Agent, or Firm—Phillips, Moore, Weissenberger, Lempio & Strabala

[57] ABSTRACT

There is disclosed a trunnion support assembly for pivotally supporting an axle to a vehicle. The trunnion comprises a sleeve member extending into a pilot bore in the axle housing and held in place by a thrust plate and a single set of bolts.

6 Claims, 4 Drawing Figures

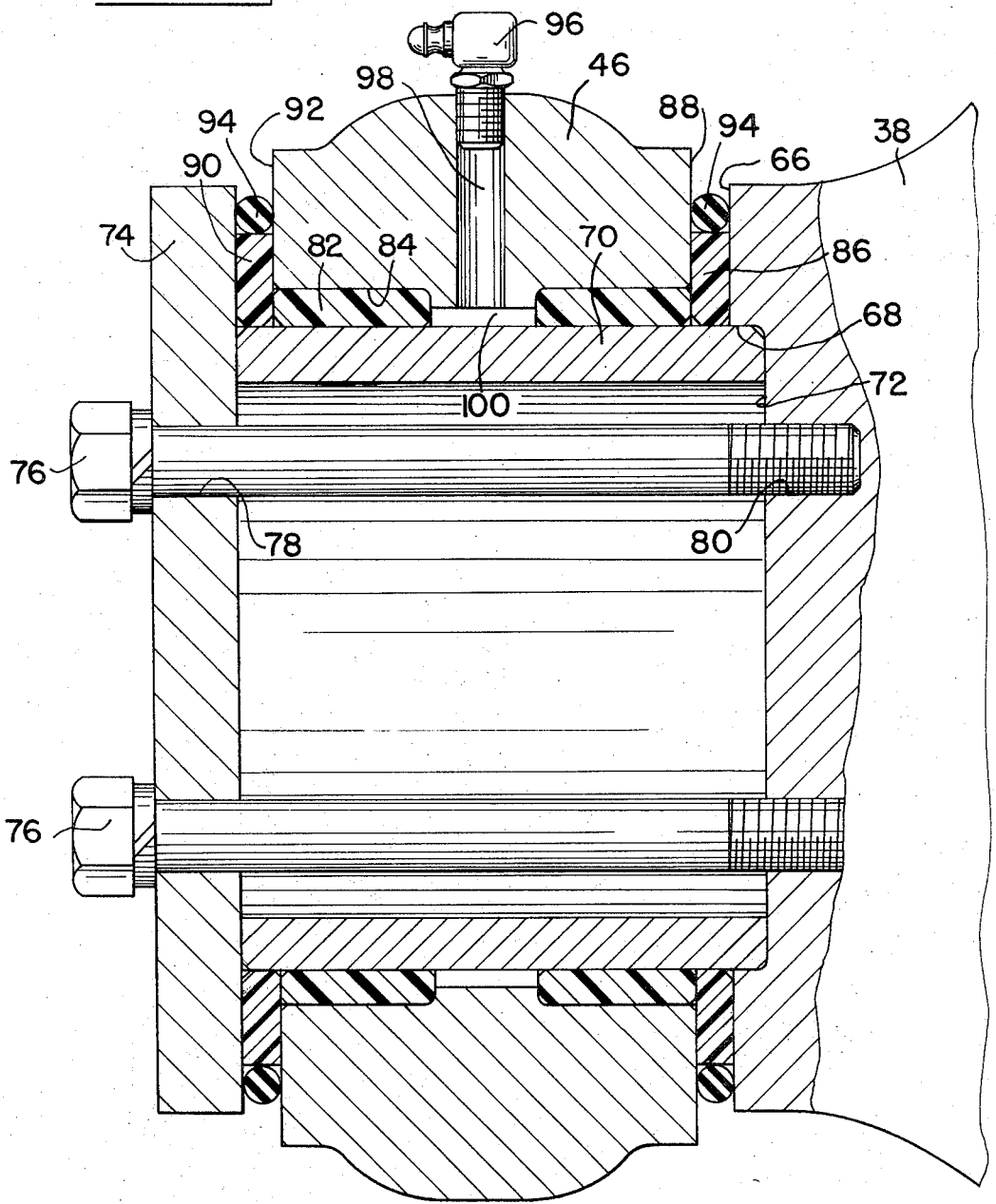

AXLE TRUNNION SUPPORT ARRANGEMENT

BACKGROUND OF THE INVENTION

The present invention relates to axle mounting means for vehicles, and pertains more particularly to trunnion bearing assemblies for pivotally mounting axles on vehicles.

One or more of the axles of motor vehicles may be pivotally attached to the vehicle body so as to accommodate movement of the vehicle over uneven terrain. These axles are commonly attached to the vehicle by means of a trunnion bearing assembly.

The prior art is exemplified by the following U.S. Pat. Nos.: 2,840,389, issued June 24, 1958 to Page; 1,405,159, issued Jan. 31, 1922 to Polaski et al; and, 1,066,072, issued July 1, 1913 to Bovas. British Specification No. 324,741, issued Feb. 6, 1950 to Van Horn is also pertinent to such constructions.

The currently used trunnion assemblies for vehicle axles are complicated and expensive to manufacture, and are expensive to install and maintain, Such trunnion assemblies normally employ complicated castings which form a part of the axle housing or which are attached thereto. Such castings normally require extensive and costly machining to form the necessary trunnion bearings and include a number of complicated parts.

SUMMARY OF THE INVENTION

It is the primary object of the present invention to provide trunnion support means that is simple and inexpensive to manufacture and to service.

Another object of the present invention is to provide simple and inexpenisve support means for pivotally supporting vehicle axles.

In accordance with the present invention, trunnion means for pivotally supporting an axle is constructed of a simple sleeve attached to the axle housings by means of a thrust plate and a single set of bolts.

BRIEF DESCRIPTION OF THE DRAWINGS

The above and other objects and advantages of the present invention will become apparent from the following specification when read with reference to the accompanying drawings, wherein:

FIG. 4 is a detailed view of a trunnion bearing assembly in accordance with the invention.

DETAILED DESCRIPTION OF A PREFERRED EMBODIMENT

Figure 1:
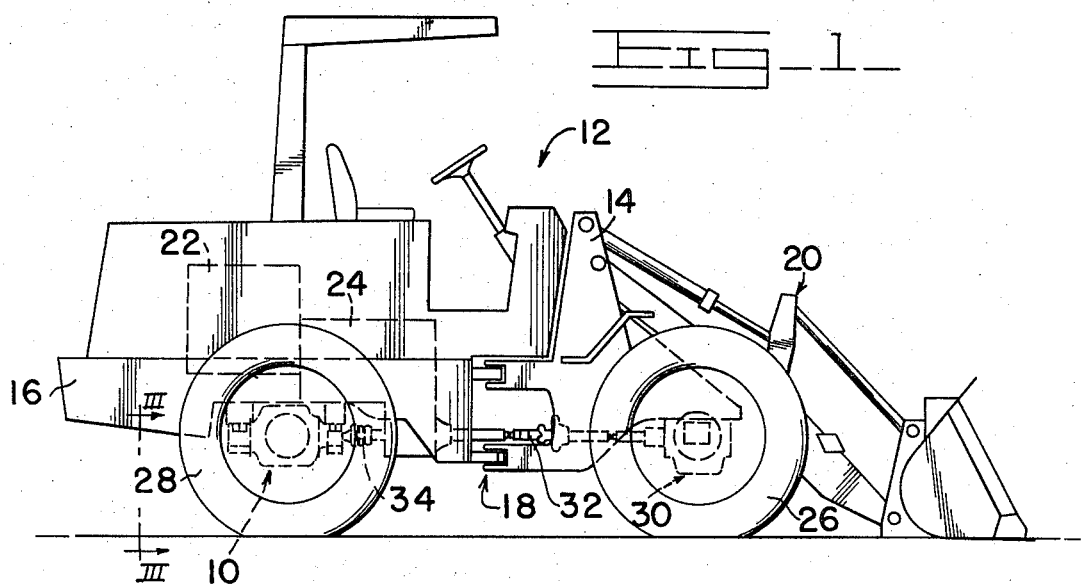
FIG. 1 is an elevational view of a vehicle incorporating the present invention.

Referring to the drawings and particularly to FIG. 1, there is illustrated a pivoting axle assembly shown generally at 10, attached to the rear of a vehicle such as wheel loader 12 having a front frame 14 and a rear frame 16, and an interconnecting articulation joint shown generally at 18. A suitable earthmoving implement 20, such as an earthworking bucket, is mounted on the front frame. An engine 22 and transmission and transfer drive mechanism 24 are mounted on the rear frame and operatively connected to power a pair of front wheels 26 and a pair of rear wheels 28. The front wheels 26 are driven through a fixed front axle and differential mechanism shown generally at 30, and a front drive line 32 which transmits power from the transfer drive mechanism 24 to the differential of the front axle. A rear drive line and U-joint system 34 transmit power from the transmission and transfer drive mechanism 24 to the rear oscillating axle assembly 10 through an input member 36, as shown in FIG. 2.

Figure 2:
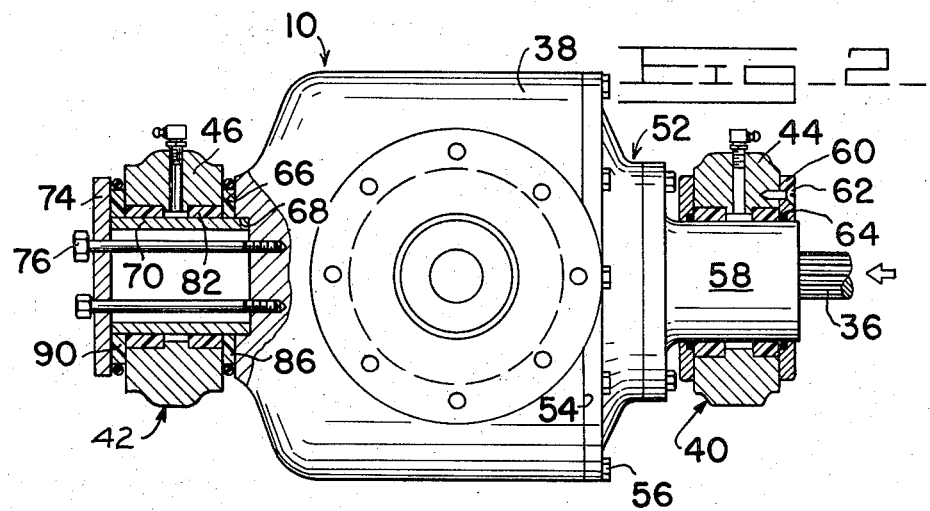
FIG. 2 is a detailed view, partially in section, of an axle trunnion support assembly built in accordance with the present invention.
Figure 3:
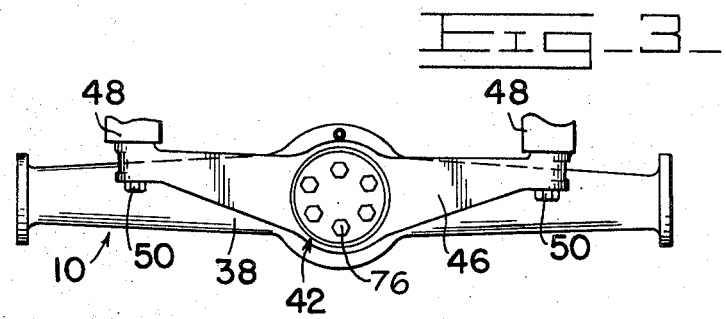
FIG. 3 is a view taken generally along lines III-III of FIG. 1.

Referring now to FIGS. 2 and 3, the axle assembly 10 includes an axle housing 38 which is transversely rockable on a front and rear trunnion arrangement shown generally at 40 and 42, respectively. A front trunnion support 44 and a rear trunnion support 46 are disposed on either side of the axle housing 38, and are secured to a pair of longitudinal frame members 48 through a plurality of bolts 50.

A differential assembly shown generally by reference numeral 52 includes an input pinion and bevel gear arrangement, as well as a standard differential gearing internally of the axle housing 38. This differential assembly is secured to a front face 54 of the axle housing by a plurality of bolts 56. A trunnion 58 conveniently forms a portion of the differential assembly, and is supported within the front trunnion support 44 by a pair of sleeve bearings 59. A pair of retaining plates 60 are removably secured on either side of the front trunnion support by a plurality of screws 62, and are adapted to contain a pair of O-ring seals 64 therein. The front trunnion arrangement 40 is thus of conventional construction and does not provide a thrust function.

The rear trunnion arrangement 42 comprises a simple and economic construction and arrangement of parts wherein a rear face 66 of the axle housing 38 is provided with a pilot bore 68 therein which is adapted to receive one end of a sleeve 70 defining a trunnion or support shaft. The outer surface of shaft 70 defines a cylindrical bearing surface. AS shown more clearly in the enlargement at FIG. 4, the trunnion sleeve 70 is urged against an inner pocket face 72 by a thrust plate 74 and a single circle of bolts 76 which pass through a corresponding plurality of apertures 78 therein and are inserted in a plurality of threaded bores 80 in the housing. The trunnion and the axle housing pivot on the trunnion support 46 through an intermediate pair of sleeve bearings 82, which are disposed in a corresponding pair of stepped bores 84 defining a through bore in the support. A front thrust washer 86 is disposed between the rear face 66 of the axle housing and a front face 88 of the support in circumscribing relation to the sleeve 70. Similarly, a rear thrust washer 90 is disposed between the thrust plate 74 and a rear face 92 of the support.

The sleeve bearings 59 and 82, as well as the thrust washers 86 and 90, are preferably made of laminated phenolic plastic material with a fabric base. Such antifriction material has low wear properties, and is desirable for those locations subject to limited rotary movement, but high loads. A fabric is contiguously associated with the wear surface, and is bonded into a phenolic resin preferably containing uniformly dispersed graphite. One such phenolic material bushing which is suitable, is sold under the tradename INSAROC.

A pair of elastomeric O-ring seals 94 are mounted around the periphery of the thrust washers 86 and 90 and are provided with a cross-section which is greater than the axial thickness of the thrust washers so that upon assembly, the O-rings are compressed between the associated faces to effect inproved sealing thereof. Grease or other lubricant is supplied to the bearing area via a fitting 96, a passage 98, and reservoir or pocket 100. Such lubricant extends the life of the bearings, and replenishment is needed relatively infrequently. The O-rings are excellent for allowing excess lubricant to escape, are economical, and are long-lived for the limited rotary conditions encountered.

From the above description, it can be seen that there is disclosed a novel construction for a bearing and journal arrangement for support trunnions and the like. While the present invention was conceived and developed for specific application to trunnion supports for vehicle axles, the principles thereof have application to the pivotal connection of a wide variety of members. It is to be understood that the scope of the invention is to be limited only by the scope of the appended claims.

What is claimed is:

1. A vehicle axle support assembly comprising in combination a swing axle, a trunnion bearing assembly for supporting said axle, said trunnion assembly comprising:
   a pair of co-axial cylindrical trunnion members secured to and operative to support said axle;
   one of said trunnion members comprising a sleeve member detachably secured to said axle and having an outer cylindrical bearing surface;
   a shallow bore formed in said axle and receiving one end of said sleeve;
   an annular thrust shoulder surrounding said bore; and,
   a support member having a cylindrical through bore therein and receiving said outer cylindrical bearing surface of said sleeve.

2. The combination of claim 1 comprising a plate defining an annular thrust shoulder engaging one end of said sleeve member and operative to retain said one end of said sleeve in said shallow bore and to retain said support member on said sleeve.

3. The combination of claim 1 wherein: said sleeve includes a cylindrical through bore;
   a plurality of bolts extending through said plate and said through bore and retaining said plate and said sleeve in position with respect to said axle.

4. A bearing and support assembly for pivotally connecting a first member to a second member, said assembly comprising:
   a sleeve defining a shaft having a cylindrical outer bearing surface;
   a shallow bore formed in one of said members and detachably receiving one end of said sleeve;
   a through bore formed in the other of said members and including bearing means rotatably receiving said outer bearing surface of said shaft; and,
   a thrust plate detachably secured to and engaging the opposite end of said shaft and defining an annular shoulder operative to retain said other of said members in position on said shaft.

5. The assembly of claim 4 wherein said first member includes an annular shoulder surrounding said bore and the annular shoulder of said thrust plate is disposed in opposition thereto.

6. The assembly of claim 5 wherein one of said members is an axle; and,
   the other of said members is a support member attached to a vehicle frame.

* * * * *

UNITED STATES PATENT OFFICE
CERTIFICATE OF CORRECTION

Patent No. 3,811,699          Dated May 21, 1974

Inventor(s) Robert Casey

It is certified that error appears in the above-identified patent and that said Letters Patent are hereby corrected as shown below:

Column 2, line 65 -- Change "INSAROC" to ---INSUROK---

Signed and sealed this 22nd day of April 1975.

(SEAL)
Attest:

RUTH C. MASON
Attesting Officer

C. MARSHALL DANN
Commissioner of Patents
and Trademarks